March 29, 1927.
T. J. LEWIS
1,622,833
SPATULATING MACHINE
Filed June 19, 1926
Fig. 1.
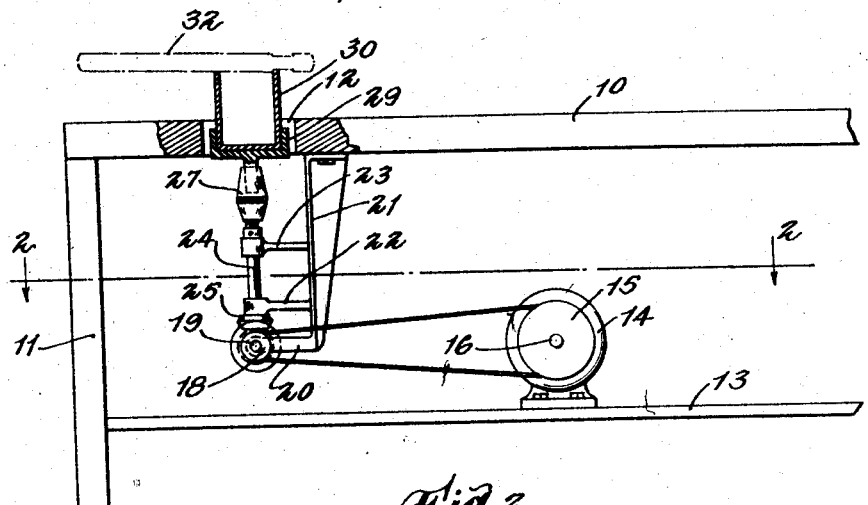
Fig. 2.
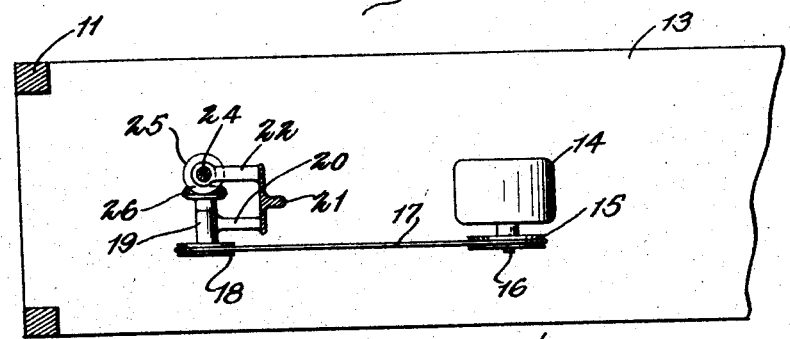
Fig. 3.
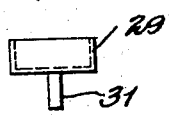
Fig. 4.
Fig. 5.
Inventor
Thomas J. Lewis
By his Attorney
George C. Heinrich Patented Mar. 29, 1927.

1,622,833

UNITED STATES PATENT OFFICE.

THOMAS J. LEWIS, OF NEW YORK, N. Y.

SPATULATING MACHINE.

Application filed June 19, 1926. Serial No. 117,110.

The present invention relates to improvements in machines for wiping the surplus of material from jars or similar containers, after they have been filled, for instance with cleansing cream, by means of an apparatus forming the object of a co-pending application.

It is the principal object of the invention to provide a so-called spatulating machine in which the jars or containers are placed in cups or sockets, which are then subjected to rapid rotation, so that by the use of a spatula of peculiar construction, the surplus of material, as for instance, cleansing cream, can quickly and readily be removed from the open jar in order to prepare the same for closing.

Another object of my invention is the provision of a spatulating apparatus allowing an operation upon jars of any desired size.

A still further object of my invention is the provision of a machine of simple, and therefore inexpensive construction, yet durable and efficient in its operation.

These and other objects and advantages of my invention will become more fully known as the description thereof proceeds and will then be more specifically defined in the appended claims.

In the accompanying drawing, forming a material part of this disclosure:

Fig. 1 is a side elevation of a spatulating machine constructed according to my invention, partly in section.

Fig. 2 is a top plan view seen in the direction of arrows 2—2 of Figure 1.

Fig. 3 is a detail view of a cup.

Fig. 4 is an eye view of a spatula.

Fig. 5 is a plan view thereof.

The spatulating machine according to my invention, as shown on the drawing, comprises a table 10 supported by legs 11 and having an opening 12 near one of its ends. A lower shelf 13 on said table below its plate, supports a motor 14 having a pulley 15, on its shaft 16 the rotation of which is transmitted by a belt 17 or the like to a pulley 18 on a stub shaft 19 rotatably held by an arm 20 at the lower end of a bracket 21, the upper end of which is attached to the underside of the table plate.

The bracket 21 intermediate its ends carries two forwardly projecting arms 22, 23, the outer ends of which form bearings for a vertical stub shaft 24, which carries at its lower end a bevel gear 25 in mesh with a bevel gear 26 on the end of shaft 19 opposite to pulley 18. At its upper end the shaft 24 carries a chuck 27, and below the same a collar 28 resting upon arms 23.

The chuck 27 is adapted to receive and hold exchangeably a cup 29 of required size for the reception of the jars 30 containing the cleansing cream, and to be spatulated. The cup 29 has a lower depending stem 31, adapted to be engaged and held in the chuck.

A spatula 32 of peculiar construction having a handle formed at one end thereof, and a head 33 at its opposite end has its side edges cut away as at 34 and 35 for engagement and guidance along the upper end of the jar.

The operation of my novel spatulating machine will be apparent from the above description. Upon starting the motor the chuck will receive a rapid rotation and a cup of any desired size of the jar of cream placed in said cup, will participate in said rotation so that the operator by moving the spatula across the jar and guiding the upper edge of the same on the recess of the spatula, can uniformly and smoothly spatulate the cream and then prepare the jars for closing.

It is to be understood that such changes may be made in the general arrangement of my device and in the construction of its minor details as come within the scope of the appended claims, without departure from the gist of my invention.

Having thus described my invention, what I claim as new, and desire to secure by Letters Patent is:

1. Spatulating machine comprising a support, brackets on said support, a stub shaft held in said brackets, means for rotating said stub shaft, a chuck on said stub shaft, a seat having a depending stem adapted to be held in said chuck, said seat adapted for the reception of jars of varying diameters, and a means adapted to be guided over the upper edge of said jars for wiping the surplus of material from said jars during their rotation with said seat.

2. Spatulating apparatus comprising a rapidly rotated seat, adapted for the reception of jars of varying diameters, and a spatula having guide means formed at its edges adapted to engage the upper edges of the jars for wiping the surplus of material from the same during the rotation of said seat.

3. A spatulating apparatus for cream containers, comprising a table having an opening in its plate, a lower plate, a motor on said lower plate, a bracket depending from the upper table plate, a pair of lateral arms on said bracket, sockets at the free ends of said arms, a vertically disposed stub shaft rotating in said sockets, a collar holding said shaft in position, a means at the lower end of said shaft adapted to be rotated from said motor, a chuck at the upper end of said shaft adapted for the reception of a seat, said seat having a depending stem engaging in said chuck and adapted to be held therein, said seat arranged in the opening of the table plate, and to hold jars of varying sizes, and a means adapted to be guided over the upper edges of said jars during the rotation of said shaft for spatulating the surplus of material from said jars during this rotation.

In testimony whereof I affix my signature.

THOMAS J. LEWIS.